United States Patent [19]
Fishel et al.

[11] Patent Number: 5,189,779
[45] Date of Patent: Mar. 2, 1993

[54] METHOD OF INSTALLATION OF A GROMMET ASSEMBLY TO A WALL PANEL

[75] Inventors: Duane D. Fishel, Oswego; Nancy K. Rogers, Naperville, both of Ill.

[73] Assignee: Allsteel Inc., Aurora, Ill.

[21] Appl. No.: 795,120

[22] Filed: Nov. 20, 1991

Related U.S. Application Data

[62] Division of Ser. No. 682,687, Apr. 9, 1991, Pat. No. 5,144,777.

[51] Int. Cl.$^5$ ...................... B23P 11/02; B21D 39/00; B65D 55/00; F16L 5/00
[52] U.S. Cl. ........................................ 29/453; 29/513; 16/2; 174/153 G
[58] Field of Search ............... 29/450, 453, 513; 16/2; 174/153 G; 52/221, 144, 58, 204

[56] References Cited

U.S. PATENT DOCUMENTS 4,626,620 12/1986 Plyler ............................. 174/153 G
4,688,491 8/1987 Herrera et al. ................. 174/152 G Primary Examiner—Robert L. Spruill
Assistant Examiner—Carmine Cuda
Attorney, Agent, or Firm—Lee, Mann, Smith, McWilliams, Sweeney & Ohlson

[57] ABSTRACT

A grommet assembly for a wall panel and method of installation. The grommet assembly includes a grommet structure for insertion into the aperture made through a wall panel and includes pivotal locking arms for locking at the back face of the wall panel. An insert sleeve provides a circular wall that upon insertion into the grommet pivots the pivotal lock arms of the grommet. The insert sleeve is further provided with snap-engagement members that snap-engage to the circular wall of the grommet so that the grommet assembly is fastened together and to the wall panel. A retention ring may be used prior to cutting an aperture in the wall to secure fabric, or other wall coverings, around the aperture to be cut to prevent displacement or tearing, and to protect the outer wall surface. The method includes the field installation of the grommet assembly from one side of a wall panel.

6 Claims, 3 Drawing Sheets

METHOD OF INSTALLATION OF A GROMMET ASSEMBLY TO A WALL PANEL

This application is a division of application Ser. No. 07/682,687, filed Apr. 9, 1991 now U.S. Pat. No. 5,144,777.

BACKGROUND OF THE INVENTION

The invention generally relates to a grommet assembly for granting access through a wall, particularly a wall panel of the type used in space divider systems. More specifically, the invention is directed toward a grommet assembly that may be field installed through a wall panel at substantially any location thereon.

The invention is further related to a method for field installing a grommet assembly through a wall panel from one side of the wall surface only. The invention is even more specifically directed toward providing a grommet assembly that is non-resiliently and non-frictionally insertable through an aperture in a wall and locked thereto without damage to the wall, particularly for use with wall panels having relatively fragile acoustical laminations where damage is difficult to avoid.

Grommets have been used in interior space divider panel systems for granting access through a wall to provide computer cables, data connection modules, electrical wires, plug outlets, jacks, and the like, to a workstation. For example, in numerous office environments, a multi-wall arrangement divides a space into individual, personal workstations that often require numerous electrical conduits, receptacles, computer connectors and telephone lines to be within easy reach at each of often differently configured work areas. It would greatly improve these wall systems by permitting the end user to field install a grommet assembly at a desired location and not be limited to the manufacturer's arrangement or be required to pay increased costs for special order panels. It also would be a benefit to allow an entire wall system to be installed first, leaving the placement of the grommets for later when exact needs and workstation functions are determined. This also permits the panel installation contractor to erect the divider system and field install the grommets at the user's own particular locations.

In connection with wall panel divider systems, sound attenuation layers are usually provided in most systems wherein a first layer is often a fibrous acoustical layer laminated to a backer layer that has a different density and thickness, for example, a honeycomb cardboard structure. Other types of wall panels using hard backer boards with a covering layer of fibrous material, or the like, also are widely used. Other wall panel configurations further include laminated layers over a gypsum board, or a double gypsum board layer interposed by an acoustical layer therebetween. A field installed grommet assembly usable in these various walls, with various thickness, would be desirable.

In some common space divider systems parallel sets of wall panels are capped at the top and set atop channels below, leaving a chamber therebetween for the placement of cables, wiring and the like. It would be desirable to provide for the field installation of a grommet assembly to access this interior chamber with installation only from one side of the panel system and yet securely lock the grommet assembly in place. The locking feature would be especially desirable if the end user intends to install a computer data module or wall jack, since it would be important that the grommet be firmly attached to the wall when plugs or connectors are connected and disconnected.

Many types of materials are used for wall panel divider systems, including wood veneers over plywood, fire resistant gypsum boards, solid wood panels, sound attenuation batts, mineral and glass fiber layers, and honeycombed cardboard backer laminates. Often the front faces of these panels are covered by a decorative surface which may comprise a woven fabric, vinyl coat, paper, plastic, acrylic, latex, and a variety of known aesthetically pleasing materials. Accordingly, it would be important to maintain the pleasant appearance of the wall adjacent a grommet assembly so that the assembly might be field installed without harming the surrounding surfaces. Cutting through a fabric layer, for example, could cause snagging or pulling adjacent the grommet aperture thereby misaligning the fabric pattern or symmetry which the interior wall panel surface was intended to have.

One type of prior art grommet device is disclosed in U.S. Pat. No. 4,688,491 to Herrera et al. for use as a desk top grommet having an adjustable panel for selective access to equipment cabling and plugs. This type of device, while useful in its own way, does not address the problem of installing a grommet assembly through a wall panel from one side only and locking the assembly to the wall.

It has therefore been a goal in the interior wall construction industry to provide a means for cleanly cutting through multi-laminate panels having the different types of materials and surfaces often used. For example, a fiberglass panel may be covered by a woven fibrous layer that is held in tension at peripheral edges of the panel and backed by a honeycombed cardboard sound attenuation, backer support layer. It would be necessary for a field installation to cut through these three layers, given their different properties, without harming surrounding areas and at the same time making a neat accurate cut for the attachment of a grommet assembly through the resulting aperture. As a result, the present invention addresses this need by the provision of a self-locking grommet assembly that may be used in a method, including the cutting of an aperture through multi-laminate boards as well as simple single layer uncovered panels, which allows for a non-resilient non-resistant insertion through the aperture to prevent damage to the wall. It is therefore an object of the invention to provide a grommet assembly and installation method therefor.

When a grommet is to be installed on a woven fabric covered panel, it is critical to prevent darting, tearing, stretching or displacement adjacent the aperture during and following the cutting to prevent the decorative appearance from being destroyed. It is therefore also an aim of the invention and a long sought goal in the space divider systems arts to provide for the easy field installation of a grommet assembly on surface covered panels that must be protected.

Considering the wide variety of modern day office equipment, it is also important for a grommet assembly to have the capability of receiving complex computer data modules while also have the capability of being used simply as a pass-through for the feeding of cables and electric wiring to a work surface. It is also a related objective of the invention to allow for a grommet opening to include a snap closure fastener to seal the access opening when not in use.

It is concomitantly a goal of the invention to provide for a multi-component grommet assembly that achieves a smooth non-interfering and substantially frictionless insertion of a first component followed by a locking insertion of a second component for lockingly engaging to the first and at the same time lockingly engaging the first component to the wall. Accordingly, it is a goal of the invention to lock a grommet assembly after a first member has been safely extended fully through a wall panel thereby eliminating wall panel damage during the attaching or inserting step.

SUMMARY OF THE INVENTION

In consideration of the needs for effective grommet arrangements that exist in the wall panel industrial arts, and related room divider systems, a grommet assembly is provided that may be field installed and lockingly arranged through a wall panel aperture in a wide variety of wall systems ranging from simple one-layer gypsum board walls to more complex multi-laminate acoustical wall systems. The grommet assembly is insertable by a unique process which avoids harm to adjoining areas of the wall to maintain aesthetic qualities and which aids in properly forming the aperture for the accurate installation of the grommet assembly.

The grommet assembly is comprised basically of a grommet structure and an insert sleeve for operatively locking the grommet structure to the wall and substantially simultaneously locking the insert sleeve itself to the grommet structure. Thereby, the grommet assembly is lockingly engaged to the wall preventing outward displacement thereof so that a myriad of connectors, data modules, jacks, terminals, plugs, receptacles and the like, can be mounted at an access window of a face plate of the insert sleeve. The grommet structure is uniquely formed with a pair of initially passive pivotal locking arm means maintained in an axial direction and extending from a circular wall of the grommet structure. The circular wall includes and outward flange for retention at the front face of a wall panel. The circular wall of the grommet structure is smoothly passed through an aperture cut through a wall panel having substantially the same diameter whereby the pivotal locking arm means are poised to be hingedly pivoted over the back face of the wall panel. In this relaxed or poised condition, the pivotal locking arm means are positioned to be pivoted upon the entrance of the insert sleeve, which has a discontinuous circular wall having positionally corresponding wall segments thereof for causing outward radial contact against the pivotal locking arm means to cause said pivoting action the back face of the panel and also locking the grommet structure. Gaps extend between the wall segments of the insert sleeve and have snap-engageable means formed therein which extend axially for less than the height of the wall segments but sufficiently dimensioned to snap over a rim edge of the circular wall of the grommet structure to lock the insert sleeve to the grommet structure. The insert sleeve further includes a face plate at the front face of the wall panel from which the circular wall segments and snap-engageable means project. The face plate may have a decorative surface and an access window therethrough for the passage of cabling, and the like, or for the connection thereat of plugs, receptacles, data modules, etc.

The insert sleeve may optionally include reinforcement on the wall segments whereby firm positive radially outward force is created against the pivotal locking arm means of the grommet structure to forcefully retain them against the back of the wall panel. In this regard, back edges of the pivotal locking arm means may be provided with a cam-like lip, or bead, ensuring that pivoting for a full 90° occurs whereby to further surely lock the pivoting arms at the back of the wall panel surface.

The invention further encompasses the provision of a retention ring, which is initially placed over the front face of a wall panel at the spot where the grommet assembly is needed. The retention ring is primarily useful for those types of wall panels having a relatively fragile wall covering or skin. The retention ring is provided with a very tacky adhesive at one side for adhesive contact to the wall panel covering, for example, a woven polyester fabric. It thereby holds the fabric and prevents it from snagging or darting upon the subsequent cutting of the grommet aperture. Preferably, the aperture would be cut by a tubular cutting means suitably designed for cutting through the fabric and underlying wall panel layers. The retention ring also acts as a guide for the tubular cutting member so that an aperture may be both cleanly and accurately cut through a wall panel. The retention ring is useful for various types of wall panel surfaces that could be harmfully abraded, fractured, split, ripped, snagged, or the like, upon the use of a revolving cutting tool. The retention ring would be suitably sized in order to be discreetly covered by the face plate of the insert sleeve.

The preferred method for the installation of the grommet assembly begins with placing the retention ring on the wall surface. If damage to the exterior surface is not a concern, the retention ring may be eliminated. The retention ring has a peel-off layer to be removed to expose a tacky adhesive underneath. The ring is then pressed onto the wall and a tubular cutting member is selected having a diameter of about the same size as the inside diameter of the ring. The ring therefore will act as a hole-cutting guide. The tubular cutter is then attached to a power drill means and revolved to cut through any outer covering of the wall and then through any sound attenuation layers and laminates forming the wall panel. The tubular cutter is then retracted leaving an aperture through the wall. Next the grommet structure is non-resiliently and substantially frictionlessly inserted through the aperture with the circular wall thereof in freely sliding, but intimate contact, with the inside of the aperture. Forceful radial contact is avoided to protect the wall layers. At full insertion the outer flange of the grommet structure rests against the retention ring and the pivoting lock arm means reside generally co-planar with the back face of the wall panel. At this point, the insert sleeve is aligned so that its circular wall segments are positioned to contact the backs of the pivotal lock arm means, whereby the snap-engagement means therebetween positionally correspond with the engageable rim edges of the circular wall of the grommet structure. The insert sleeve is then axially urged into the grommet structure and the wall segments contact the backs of the pivotal locking arm means pivot them to lock-over the back face of the wall panel, while substantially simultaneously snap-engaging the snap-engagement means over the circular wall rim edge of the grommet structure at points thereon between said pivoting lock arm means. Thereby the grommet assembly is securely fastened together and to the wall panel by virtue of the hinged action of the pivot lock arm means at the back face of the panel and by means of the flange of the grommet structure being urged against the front face of the wall panel.

Upon the insertion of the grommet assembly, weakened lines forming an access window on the face plate may thereafter be knocked out. The access window may optionally be pre-formed by the manufacturer or knocked out by the installer before inserting the sleeve into the grommet structure. The access window may be formed in various configurations as required in a particular wall system.

The depths of the engageable portions of the grommet structure and insert sleeve are made according to the thickness of the wall panel structure. The invention therefore provides a discreet locking from only one side of a wall panel and allows for the installation to be made without damage to delicate or frangible wall panel materials, such as fiberglass, mineral fiber, gypsum, honeycombed cardboard acoustical structures, fabric layers, and the like.

DETAILED DESCRIPTION OF THE INVENTION

Figure 1:
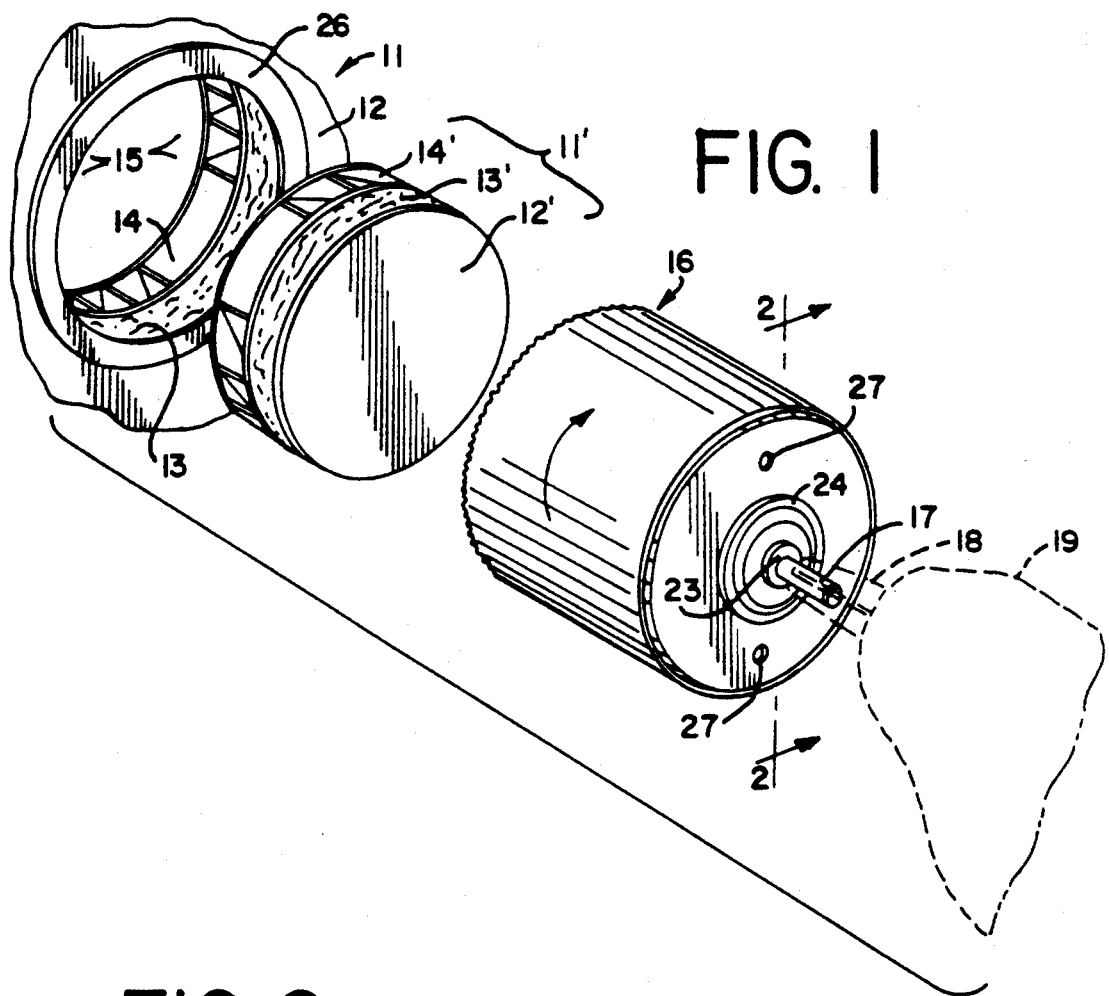
FIG. 1 is a cut-away exploded view of a multi-layered wall panel having a cylindrical portion cut-out by a cutting member for the creation of a grommet aperture and wherein a retention ring extends around the aperture tensely retaining a fabric panel covering layer therearound.

In the following description, like reference numerals throughout refer to the same elements.

The invention is directed toward a grommet assembly and the method of its installation. The invention is useful for application to walls, wall panels, and wall boards for a variety of space divider systems. The invention is particularly suited to multi-layered acoustical panels having a fabric covering, by making it possible to field install a grommet without harming the decorative fabric outer covering or underlying acoustical and support layers. Therefore, turning first to FIG. 1, a multi-layered wall panel 11 is shown during the method of installing the unique grommet assembly, as will be explained below. The wall panel 11 is a composite layered structure having a fabric outer covering 12 covering, but not adhesively bonded to, an acoustical layer 13 that has adhesively bonded therebehind a backer layer 14, which in the disclosed embodiment comprises a honeycombed cardboard having both sound attenuation and structural support properties, as would be known in the industry. The acoustical layer 13 consists of a fiberglass material typical for acoustical panels, particularly those used in office space dividing systems. The wall panel 12 has a fairly standard construction whreinthe acoustical layer 13 is ⅜ inch thick and the backer layer 14 is ½ inch thick. The wall panel 11 has a cut-out aperture 15 therethrough. The aperture 15 is formed by the removal of a cylindrical segment 11' having cut-out layer sections 12' 13' and 14' made by a tubular cutter 16. FIG. 1 accordingly shows the removal of the segment 11' following rapid revolution of the cutter 16 in the direction of the arrow. A stub shaft 17 at the base of the cutter 16 is engaged to the chuck 18 of a power drill 19 shown in phantom to the right.

Figure 2:
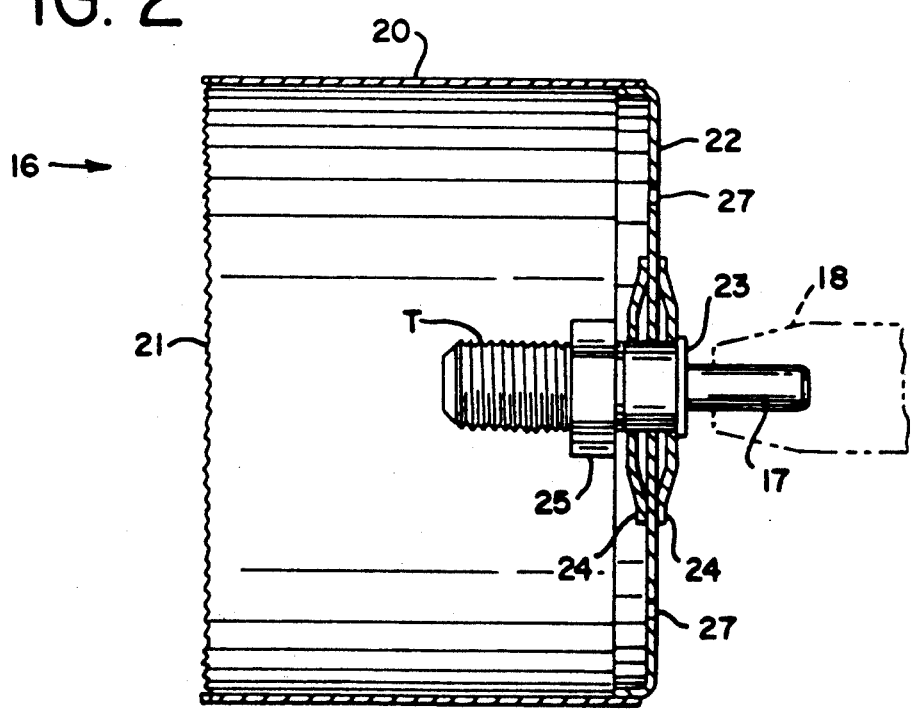
FIG. 2 is a sectional view of a tubular cutter for forming the grommet aperture of FIG. 1.

A vertical sectional view of the tubular cutter 16 is shown in FIG. 2. The cutter 16 having an outer cylindrical housing 20 with a frontward serrated peripheral cutting edge 21. A base 22 is formed at the opposite end and includes a bushing with a pair of compression washers 24 that are locked to the base 22 by a known means of threading down a nut 25 on a threaded shaft 26.

In the preferred embodiment, a retention ring 26 is used for purposes of securing the fabric 12. It has an inside diameter substantially the same as the housing body 19 of the cutter 16, so that the tubular cutter 16 fits within the retention ring 26 during the cutting step. The retention ring 26 is cut from a sheet of suitable tough plastic and has a removable strip of paper covering a tacky adhesive at the side attached to the fabric 12, as shown in FIG. 1. The adhesive has high tackiness in order to tensely grip the fabric, an example of which is formulation number F950PL sold by 3M Company. This provides for a very taught gripping attachment of the retention ring 26 to the fabric 12 to secure it in place during the revolutionary cutting action of the tubular cutter 16 as the serrated edge 21 whirls through the composite wall panel 11. The use of the retention ring 26 is of great significance in those types of fabric covered panels wherein only a peripheral attachment of the fabric to the panel is made. Thus, across the face of such panels, as in wall panel 11, the fabric 12 is held in tension thereagainst with no direct bonding to the face of the acoustical layer 13. It Will be appreciated by those skilled in panel construction that the spinning tubular cutter 16 might otherwise grip and tear the fabric causing darts and leave a ragged disheveled area adjacent the aperture 15. This is significant when fabric patterns need to be maintained and a clean even cut is desirable around the grommet-to-be-installed. Some wall systems may have laminated or non-laminated outer surfaces, which may not cause problems during cutting and a retention ring 26 for protecting the aperture-adjacent portions may not be required. However, the retention ring 26 also serves a function as a positioning guide for the tubular cutter 16, so that the end user may accurately position the aperture where needed at a workstation by adhering the retention ring 26 at the chosen spot and thus ensure that the aperture 26 will be cut there.

In the disclosed embodiment, the fabric covering 12 comprises a typical woven material often found in fabric covered wall space divider systems comprising a weave of 100% filament polyester having 144 ends per inch (epi) and 60 picks per inch (ppi). Other commonly used fabric materials are blends of wool and polyester. Some include polyester, silks and rayon combinations with a small percentage of flax.

Non-fabric, coverings, such as vinyl, paper, and even paints and acrylic latex coatings, might be used as wall coverings, which might require the retention ring 26 for the preservation of the integrity of the covering material adjoining the aperture.

Following the excision of the cylindrical cut-out section 11', cut-out section 11' will usually remain lodged within the cutter housing 19 and as a result the base 22 of the tubular cutter 16 is provided with knock-out holes 27 making possible the removal of the cutout wall portion 11' by pushing it out with a nail, small screw driver, or the like.

Figure 3:
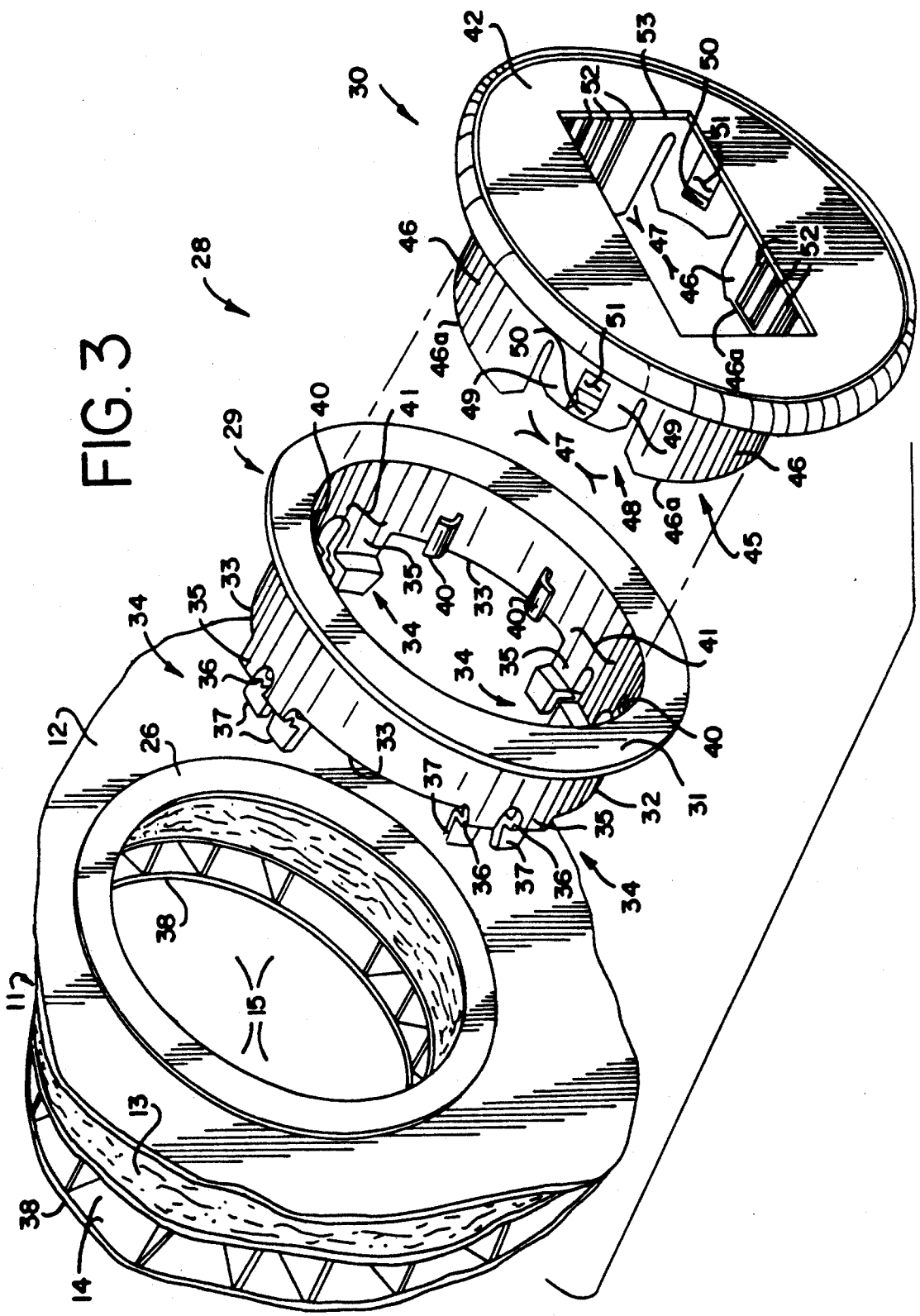
FIG. 3 is an exploded perspective view of the aperture as formed in FIG. 1 having the retention ring therearound and wherein a grommet structure is spaced ready to be smoothly and non-resiliently inserted, followed by the locking engagement of an insert sleeve at the right.

After the creation of the aperture 15, the inventive grommet assembly may be installed. With reference to FIG. 3, an exploded view of a grommet assembly 28 in accordance with the invention is shown for insertion into the aperture 15. In cooperation with the optional retention ring 26, the grommet assembly 28 comprises two components, a grommet structure 29 and an insert sleeve 30. A goal of the invention is to achieve a smooth, essentially non-frictional and non-biasing insertion of the insert structure 29 through the aperture 15 wherein it is unimpeded by, and likewise does not affect, the inner surfaces of the aperture 15, namely the layers 12, 13 and 14. It is therefore intended that the invention can be used for a wide variety of laminated panels. Often in the past, resilient snaps and brackets for grommet designs were provided to resiliently bias against the interior walls of an aperture during insertion. This can cause snagging or damage to the wall. The use of the grommet structure 29 is effective for apertures cut through various wall panels, such as made of solid wood, gypsum board, multi-laminates of gypsum boards, fiberglass, mineral wool, or honeycomb cardboard, and a wide variety of covering materials. The attachment of the grommet structure 29 is largely independent of the laminates through which it passes. This is primarily made possible by the provision of a relaxed or passive pivoting lock means that are kept in the relaxed position poised to be lockingly engaged at a back face surface of the backer layer 14 only when the grommet structure is fully inserted. The locking of the grommet structure 29 occurs after insertion through the aperture 15 when the insert sleeve 30 has been inserted.

Figure 4:
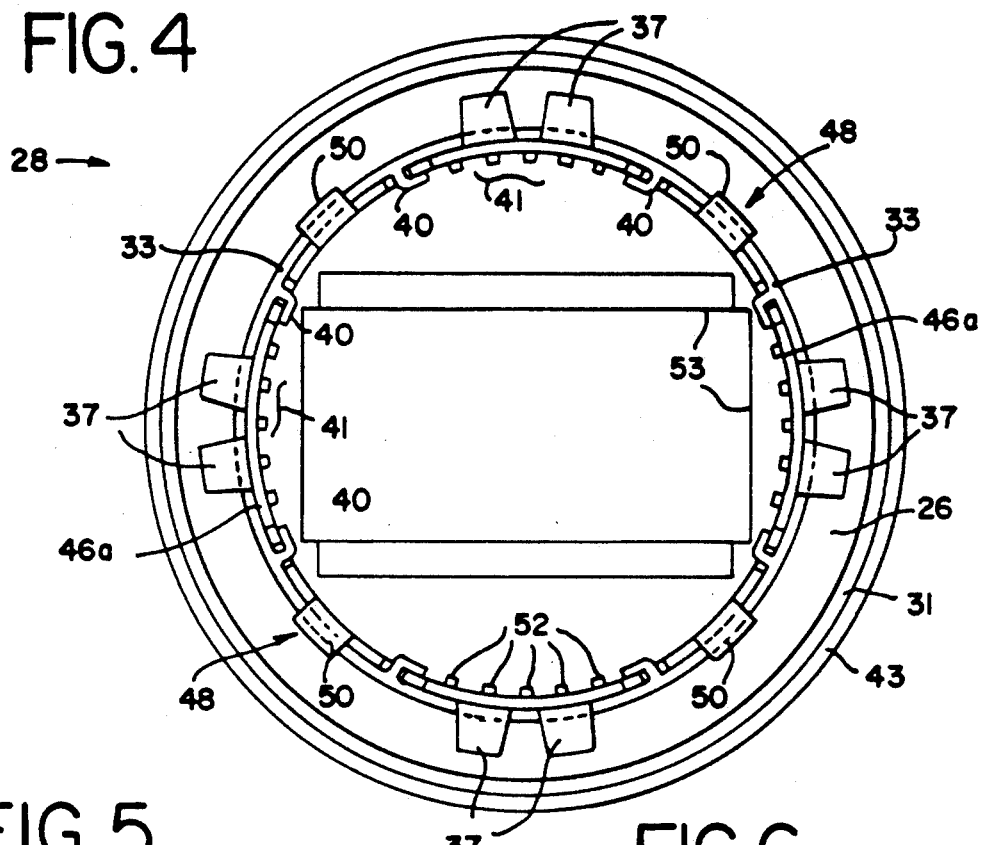
FIG. 4 is a rear view of the installed grommet assembly showing the pivotal locking arms of the grommet structure fully pivoted and reinforcing means and guide means for facilitating the locking attachment of the insert sleeve to the grommet structure.
Figure 5:
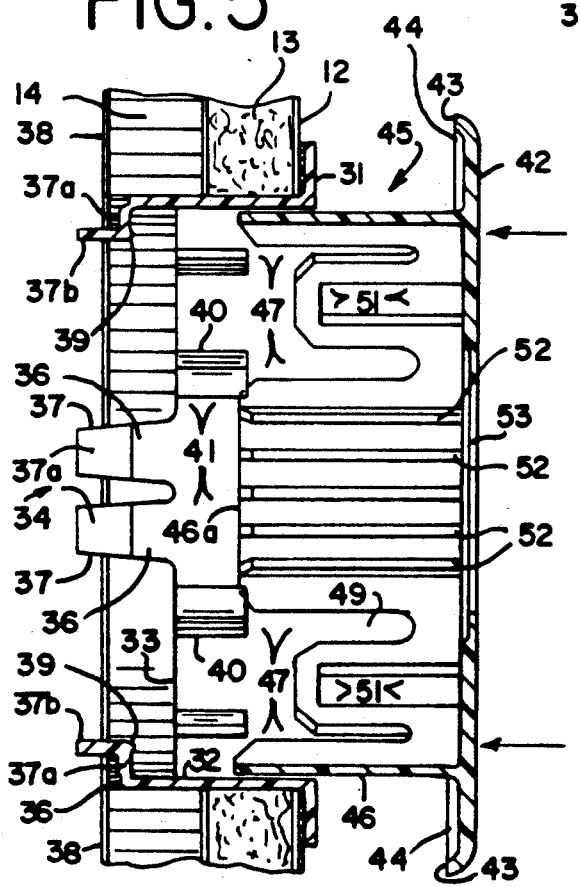
FIG. 5 is a sectional view of the grommet assembly during the insertion of the insert sleeve through the previously-inserted grommet structure; and, FIG. 6 is a sectional view as in FIG. 5, showing the full locking engagement of the grommet assembly with the hinged pivotal locking arm means locked to the back face of the wall panel and wherein the snap-engagement means of the insert sleeve are lockingly engage to rim edges of the circular wall of the grommet structure.

More particularly, FIGS. 3 and 5 illustrate the stepped process for the installation of the grommet assembly 28. The final installed condition is shown in FIGS. 4 and 6.

The configuration for the grommet structure 29 provides an outer circular flange 31 to fit over the retention ring 26 and having an inner-diameter substantially the same as that of the aperture 15. From the inner circular edge of the flange 31, a circular wall 32 projects axially for a distance therefrom and sized for intimate sliding contact with the inside of the aperture 15. In the disclosed embodiment, the circular wall 32 terminates in rim edges 33, which in the exemplary embodiment comprise four rim edges 33, each located between pivotal locking arm means 34 arranged at four locations around the circular wall 32. The pivotal locking arm means 34 provide the function of attaching the grommet structure 29 to the wall panel 11. In more detail, the pivotal lock arm means 34 each comprise pairs of axially projecting first arms 35 that extend from the circular wall 32 aperture-inwardly and terminate in flexible hinges 36 hingedly joined to L-shaped lock-over arms 37. The lock-over arms 37 are arranged at a distance whereby to emerge through the aperture 15 with the flexible hinges 36 generally co-planar with the back base surface 38 of the backer layer 14, as shown in FIGS. 4 and 6. The backs of the L-shaped lock-over arms 37 are provided with cam-like projections 39 formed generally at the juncture of a shorter leg of the L-shape at 37a to the longer leg of the L-shape at 37b, which together form the L-shape of the lock-over arms 37. The purpose of the cam-like projection 39 is to facilitate full 90° rotation of the lock-over arms 37 to dispose the longer legs 37b tightly against the back surface 38 as will be explained further in connection with the construction of the insert sleeve 30. Additionally, for alignment and ease of installation, the grommet structure 29 is preferably provided with pairs of opposing hook-shaped guides 40 defining a generally curved channels 41 therebetween for receipt therein of engageable wall portions of the insert sleeve 30, as will be explained. The guides 40 are located along the interior of the circular wall 32 to circularly opposingly face and are spaced generally below and to either side of the pivotal lock arm means 34, so that the channels 41 are generally formed in an axially aligned relation to the pivotal lock arm means 34.

Figure 6:
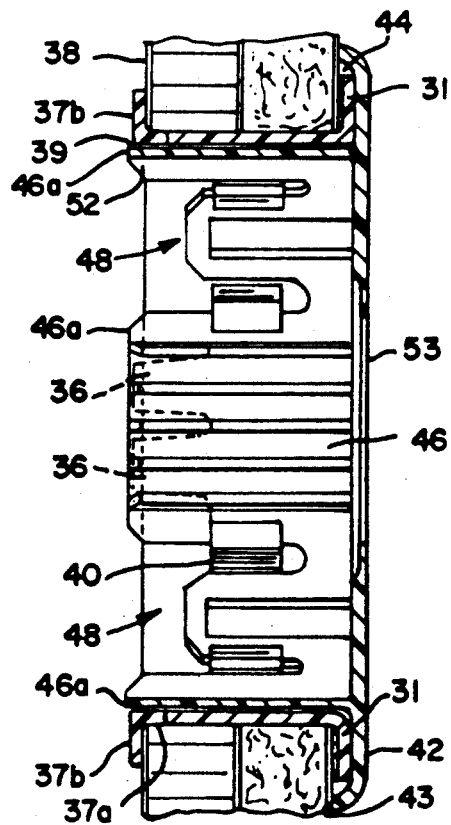

Turning now to the construction of the structure of the insert sleeve 30, attention is continued to FIGS. 3-6. The insert sleeve 30 is comprised of a generally flat face plate 42, which in the exemplary embodiment is circular. It is sized whereby to conceal the circular flange 31 of the grommet structure 29 and the retention ring 26 thereunder. The face plate 42 has peripheral in-turned edge 43 forming an annular nesting recess 44 for the flange 31 and said retention ring 26 therein. Extending aperture-inwardly from the face plate 42 extends an engageable wall means 45, which provides means for activating the pivotal lock arm means 34 and for securing the insert sleeve 30 to the grommet structure 29. The engageable wall means 45 comprises a plurality of circular wall segments 46 having gaps 47 therebetween. Within the gaps 47, snap-engageable means 48 are formed and extend axially inwardly from the face plate 42 between the wall segments 46. The snap-engageable means 48 are flange-like projections 49 that terminate in snap-over barbs 50 which are spaced back from terminal leading edges 46a of the circular wall segments 46 at a distance from the face plate 42 substantially equal to the height of the circular wall 32. Thereby, upon the full insertion of the insert sleeve 30 into the grommet structure 29, the snap-over barbs 50 each snap-over the rim edges 33 of the circular wall 32 of the grommet structure 29. In the disclosed embodiment, there are provided four circular wall segments 46 separated by gaps 47, each having an identical snap-engageable means 48 therein and thereby providing four snap-over engagements with the rim edges 33 of the circular wall 32. The flange portions 49 of the snap-engageable means 48 further are provided with central openings 51, which aid in molding the insert sleeve 30 from a plastic material, as will be understood by those skilled in the manufacturing arts. The circular wall segments 46 extend through arcs substantially the same as the channels 41 between the opposing guides 40. Thereby, the insert sleeve 30 can be guided into position by first aligning the wall segments 46 with respective channels 41 and, as shown in FIGS. 5 and 6, sliding the insert sleeve 30 axially inwardly of the grommet structure 29. In that way, the circular wall segments 46, at their terminal leading edges 46a, are aligned whereby to contact the cam-like beads 39 of the pivotal lock arm means 34 in order to pivot the lock-over arms 37 around the flexible hinges 36 and provide outwardly radial force against the cam-like beads 39 to dispose the longer arms 37b snugly against the back face 38 of the backer support layer 14. It will be apparent that the cam-like beads 39 aid in obtaining a full 90° pivot of the lock-over arms 37 into a secure locked position and also help to firmly bias the circular wall segments 46 against the lock-over arms 37.

The interior of the circular wall segments 46 are further shown provided with optional ribbing 52 which inhibits inward radial deflection during contact against the pivotal arms 37 to thereby maintain forceful contact by stiffening the circular wall segments 46.

Upon obtaining final attachment of the insert sleeve 30 to the grommet structure 29, the pivoting lock arms 37 therefore are held against the back face 38 and the snap-over barbs 50 lock the insert sleeve to the inward rim edges 33 of the grommet structure 29. The attachments serving to prevent outward displacement of the grommet assembly 28 from the wall 11. FIG. 4 shows the grommet structure 29 and the insert sleeve 30 joined together without the wall panel 11 for purposes of understanding their attachment. The assembly 28 may be provided with the three components as shown, or the retention ring 26 may be eliminated whereby the assembly would consist of the snap-engagement of the insert sleeve 30 to the grommet structure 29 and the pivoting lock arm means 34, in cooperation with the outer flange 31, attaching the grommet structure to a Wall.

In the exemplary embodiment, there are four sets of pivotal lock arm means 37 and four snap-engageable means 48 are spaced therebetween. The invention is not limited to this particular number of pivotal lock arm means or snap-engagement means but is specified herein for purposes of explanation of the disclosed example.

In the disclosed embodiment, the grommet structure 29 is made of molded polypropylene. The hinges 36 are thinly formed connectors facilitating flexure during the locking attachment and have a thickness of about 0.012 inches. The thicknesses of the lock-over arms 37a and 37b are about 0.060 inches. The insert sleeve 30 of the exemplary embodiment is made of molded acrylonitrile butadiene styrene (ABS). The retention ring 29 is die cut from a sheet of tough durable plastic provided in a thickness of about 0.032 inches in the illustrative example. The assembly 28 may be made to fit different wall thicknesses and apertures. The aperture 15 herein is about 3.562 inches, which allows for a broad variety of wiring, cables, jacks, data modules, and the like, to cooperate with the assembly 28.

The face plate 42 is provided with an access window 53, which as noted above may be made during molding/manufacturing or may be formed with peripheral lines of weakness to be knocked-out for use in the field. The rectangular configuration for the access window 53 in the detailed description of the invention would be useful, for example, for the attachment of a snap-in socket-type module or a coaxial connector base for a module, such as used for data module connectors for a computer. The access window 53 may be used simply as a pass-through for cabling, wiring and the like. The utilization of the guide channels 41 in connection with the circular wall segments 46 additionally allows for the grommet structure 29 to be placed within an aperture 15 and the insert sleeve only partially introduced, just having the circular wall segments engaging the guides 40, so that the face plate 42 may be rotated to align the access window 53 in a true horizontal or squared position relative to the panel. Thus, alignment can be made before fully inserting the insert sleeve 30 to activate the pivoting lock arm means 34 and engaging the snap-engagement means 48 to the rim edges 33 of the grommet structure 29.

It is envisioned that a broad scope of equivalents fall within the invention and the claims therefor appended hereto.

What is claimed is:

1. A method for field installing a grommet assembly to and through an aperture formed in a multi-layer wall panel, said method comprising the steps of:
   attaching a retention ring to a covered face of a multi-layered wall panel;
   guiding a tubular cutting means having a circular cutting edge of a diameter substantially equal to the inside diameter of said retention ring against the wall panel within the retention ring;
   spinning and pressing said tubular cutting means to cut through the multi-layered wall panel;
   removing an excised portion of said multi-layered wall panel cut by said cutting means and forming thereby a circular aperture therethrough;
   non-resiliently inserting a grommet means through said aperture and disposing pivotal locking means adjacent a back surface of said multi-layered wall panel;
   inserting insert sleeve means through said grommet means;
   pivoting said locking means to lock at the back surface of said wall panel;
   snap engaging said sleeve means to said grommet means; and,
   arranging face plate means at the covered face of said multi-layered wall panel thereby masking over said retention ring and grommet means.

2. The method according to claim 1 wherein the step of attaching a retention ring comprises adhesively bonding a retention ring.

3. The method according to claim 1 wherein the step of attaching a retention ring comprises attaching a retention ring to a woven fabric covered face of a multi-layered wall panel.

4. The method according to claim 1 wherein the step of spinning and pressing the tubular cutting means comprises spinning and pressing the tubular cutter means to cut through a first laminate comprised of a fibrous material and through a second laminate comprising a honey-combed cardboard layer.

5. A method for field installing a grommet assembly to and through an aperture formed in a wall panel, said method comprising the steps of:
   guiding a tubular cutting means against an outer face of a wall panel;
   spinning and pressing the tubular cutting means to cut through the wall panel;
   removing and excised portion of said wall panel cut by said cutting means and forming thereby a circular aperture therethrough;
   non-resiliently inserting a grommet means through said aperture and disposing pivotal locking means adjacent a back surface of said wall panel;

inserting insert sleeve means having a terminal leading edge through said grommet means;
pressing said terminal leading edge of said insert sleeve means against said locking means;
pivoting said locking means to lock at the back surface of said wall panel;
snap engaging said sleeve means to said grommet means; and,
arranging face plate means at the front face of said wall panel thereby masking over said grommet means.

6. The method according to claim 5 including first attaching a retention ring to the outer face of said wall panel and the step of guiding the tubular cutting means comprising further the step of guiding a cutting means within the retention ring against the wall panel.

* * * * *